United States Patent
Kim et al.

(10) Patent No.: US 8,223,858 B2
(45) Date of Patent: Jul. 17, 2012

(54) TIME SYNCHRONIZATION METHOD AND FREQUENCY OFFSET ESTIMATION METHOD USING THE SAME IN OFDM NETWORK

(75) Inventors: Hee-Wook Kim, Seoul (KR); Kun-Seok Kang, Daejon (KR); Do-Seob Ahn, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 733 days.

(21) Appl. No.: 12/442,319

(22) PCT Filed: Dec. 28, 2006

(86) PCT No.: PCT/KR2006/005832
§ 371 (c)(1),
(2), (4) Date: Mar. 20, 2009

(87) PCT Pub. No.: WO2008/035836
PCT Pub. Date: Mar. 27, 2008

(65) Prior Publication Data
US 2010/0027723 A1    Feb. 4, 2010

(30) Foreign Application Priority Data
Sep. 21, 2006   (KR) .................... 10-2006-0091984

(51) Int. Cl.
*H04L 27/28* (2006.01)
(52) U.S. Cl. ....................................... 375/260
(58) Field of Classification Search ................ 375/343, 375/316, 364, 329, 340, 260, 259
See application file for complete search history.

(56) References Cited

U.S. PATENT DOCUMENTS

| | | | |
|---|---|---|---|
| 5,732,113 A | | 3/1998 | Schmidl et al. |
| 5,940,434 A | * | 8/1999 | Lee et al. ............... 375/146 |
| 5,991,289 A | | 11/1999 | Huang et al. |

(Continued)

FOREIGN PATENT DOCUMENTS

KR       10-0191331       1/1999

(Continued)

OTHER PUBLICATIONS

Van de Beek, et al., "ML Estimation of Time and Frequency Offset in OFDM Systems," IEEE Transactions on Signal Processing, vol. 45, No. 7, Jul. 1997, pp. 1800-1805.

(Continued)

*Primary Examiner* — Kenneth Lam
(74) *Attorney, Agent, or Firm* — Staas & Halsey LLP

(57) ABSTRACT

Provided are a time synchronization method and a frequency offset estimation method using the same in an OFDM system. The time synchronization method using a preamble transmitted from a transmitter to a receiver in the OFDM communication network includes the steps of: a) calculating a moving sum of a first sequence and a second sequence obtained by a product of neighboring elements in a received signal when the received signal containing a preamble is received from the transmitter; b) estimating a location of the received signal corresponding to the moving sum having a maximum value; and c) acquiring a time synchronization with respect to the received signal, based on the estimated location, wherein the first sequence is obtained from a product of neighboring elements in the preamble and a correlation value obtained by correlating another sequence with the first sequence is smaller than a predetermined value.

3 Claims, 1 Drawing Sheet

U.S. PATENT DOCUMENTS

| | | | |
|---|---|---|---|
| 6,459,679 B1 | 10/2002 | Kim | |
| 6,678,339 B1 | 1/2004 | Lashkarian | |
| 6,738,443 B1 | 5/2004 | Böhnke et al. | |
| 7,412,012 B2 * | 8/2008 | Bothe et al. | 375/343 |
| 7,756,005 B2 * | 7/2010 | Murthy et al. | 370/208 |
| 8,054,817 B2 * | 11/2011 | Zhu et al. | 370/343 |
| 2002/0168034 A1 * | 11/2002 | Yang et al. | 375/342 |
| 2004/0066802 A1 * | 4/2004 | Ro et al. | 370/528 |
| 2004/0190438 A1 | 9/2004 | Maltsev et al. | |
| 2005/0084030 A1 | 4/2005 | Zhou et al. | |
| 2006/0050799 A1 * | 3/2006 | Hou et al. | 375/260 |

FOREIGN PATENT DOCUMENTS

| | | |
|---|---|---|
| KR | 10-2007-0049420 | 5/2007 |
| WO | WO2005/120182 | 12/2005 |

OTHER PUBLICATIONS

Tureli, et al., "OFDM Blind Carrier Offset Estimation: ESPRIT," IEEE Transactions on Communications, vol. 48, No. 9, Sep. 2000, pp. 1459-1461.

Morelli, et al., "Frequency Ambiguity Resolution in OFDM Systems," IEEE Communication Letters, vol. 4, No. 4, Apr. 2000, pp. 134-136.

Schmidl, et al., "Robust Frequency and Timing Synchronization for OFDM," IEEE Transactions on Communications, vol. 45, No. 12, Dec. 1997, pp. 1613-1621.

Kim, et al. "Efficient Time Frequency Synchronization for OFDM Based Wireless Indoor Communication Over Rician Fading Channel," 2006 Tenth International Symposium on Consumer Electronics (ISCE 2006), Jun. 2006.

* cited by examiner

[Fig. 1]
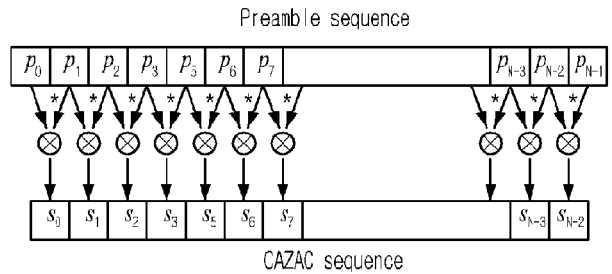
[Fig. 2]
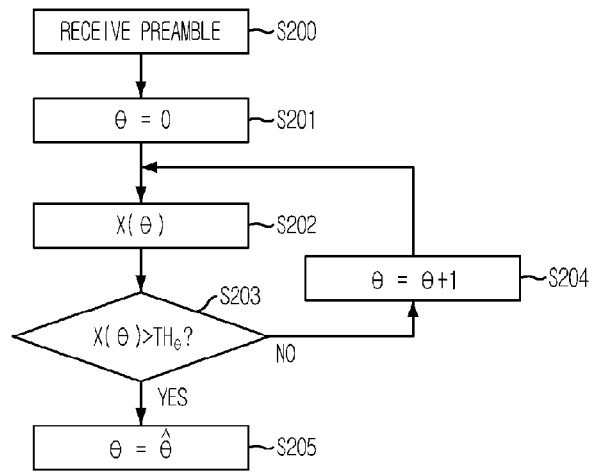
[Fig. 3]
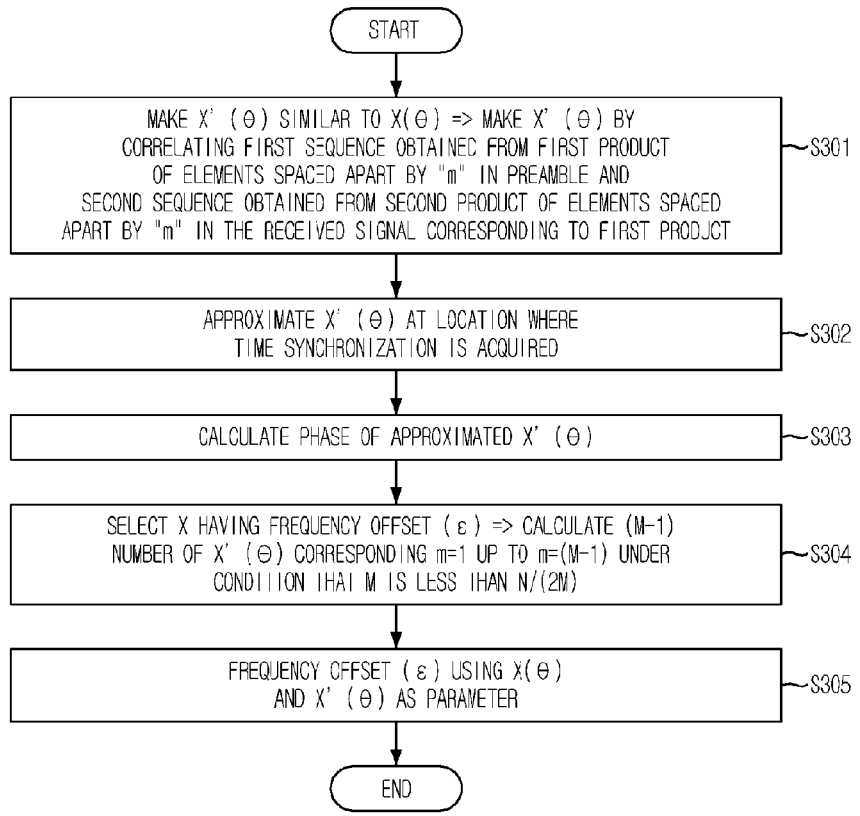

TIME SYNCHRONIZATION METHOD AND FREQUENCY OFFSET ESTIMATION METHOD USING THE SAME IN OFDM NETWORK

CROSS REFERENCE TO RELATED APPLICATIONS

This application is based on and hereby claims priority to International Application No. PCT/KR2006/005832 filed on Dec. 28, 2006, and Korean Application No. 10-2006-0091984, filed Sep. 21, 2006, the contents of both of which are hereby incorporated by reference.

TECHNICAL FIELD

The present invention relates to a time synchronization method and a frequency offset estimation method using the same in an Orthogonal Frequency Division Multiplexing (OFDM) network; and, more particularly, to a time synchronization method and a frequency offset estimation method using the same in an OFDM system, in which a preamble for the time synchronization and the frequency offset estimation is transmitted from a transmitter to a receiver and the preamble is designed such that a correlation value obtained by correlating another sequence with a sequence obtained from a product of neighboring elements in the preamble is smaller than a predetermined value. Therefore the receiver acquires the time synchronization using the preamble received from the transmitter, and the estimates the frequency offset based on the acquired time synchronization.

BACKGROUND ART

An Orthogonal Frequency Division Multiplexing (OFDM) scheme is a digital modulation scheme that is efficient in wideband digital communication systems. The OFDM scheme is applied in digital transmission/reception systems, such as European digital audio broadcasting (DAB), digital video broadcasting (DVB), asymmetric digital subscriber line (ADSL), wireless local access network (WLAN), and Wibro.

The OFDM scheme is robust against intersymbol interference (ISI), which is an important problem in high speed communication. In addition, the OFDM scheme converts frequency selective fading into frequency nonselective fading.

However, compared with a single carrier system, the OFDM scheme is sensitive to an oscillator mismatching between a transmitter and a receiver or a carrier frequency offset caused by a Doppler frequency shift.

In the OFDM system, the carrier frequency offset destroys the orthogonality between subcarriers. Because even a small carrier frequency offset causes a significant degradation of a system performance, a frequency synchronization is one of the most important issues in a system configuration.

In addition, because "eye opening" does not exist which can find an optimal sampling time, the OFDM system must use a different time/frequency synchronization scheme from a symbol synchronization used in a single carrier system. In the OFDM scheme, a time synchronization means finding an initial estimation value of a single OFDM symbol. Because the OFDM uses a cyclic prefix (CP), it is less sensitive to a symbol synchronization error, but must accurately estimate a frequency offset so that it cannot exceed an allowable error range of the CP.

A conventional time synchronization method and frequency offset estimation method used in the OFDM system can be classified into a blind type method and a data, pilot or CP dependent method.

A pilot dependent time/frequency synchronization method is disclosed in U.S. Pat. No. 5,732,113 entitled "Timing and frequency of OFDM signals, a CP dependent time/frequency synchronization method is disclosed in a paper entitled "ML Estimation of Time and Frequency Offset in OFDM Systems", IEEE Transaction on Signal Processing, Vol 45, No. 7, pp. 1800-1805, and a blind time/frequency synchronization method is disclosed in a paper entitled "OFDM blind carrier offset estimation", IEEE Transaction on Communications, Vol. 48, No. 9, pp. 1459-1461.

The pilot dependent time/frequency synchronization method uses two pilot symbols in order to both an integer part and a decimal part of a frequency offset. However, because the two pilot symbols must be inserted into a transmit signal, a data rate is reduced and there exists an ambiguity of a time synchronization estimation corresponding to a CP length in the time synchronization.

The CP dependent time/frequency synchronization method uses a correlation between a data symbol part and a CP part. This method cannot estimate an integer part of the frequency offset and cannot detect a start point of a frame, although a symbol synchronization may be achieved.

The blind time/frequency synchronization method uses a virtual carrier instead of a pilot symbol or CP. This method increases the complexity due to a vector space calculation.

In a satellite communication network, receive/transmit channels experience a rician fading having a Line of Sight (LoS) component. Thus, the conventional time/frequency synchronization method considering a terrestrial mobile communication environment, e.g., a Rayleigh fading channel, is inefficient in the satellite communication network.

Therefore, there is an increasing demand for a time/frequency synchronization method adapted for an OFDM-based satellite communication system. Specifically, a structure of a preamble transmitted from a transmitter to a receiver for a time synchronization and a frequency offset estimation must be designed efficiently. In addition, there is a demand for a method that can acquire a time synchronization using the preamble and correctly estimate the frequency offset based on the time synchronization.

DISCLOSURE

Technical Problem

It is, therefore, an object of the present invention to provide a time synchronization method and a frequency offset estimation method using the same. In an OFDM system, a preamble for the time synchronization and the frequency offset estimation is transmitted from a transmitter to a receiver and the preamble is designed such that a correlation value obtained by correlating another sequence with a sequence obtained from a product of neighboring elements in the preamble is smaller than a predetermined value. Therefore, the receiver acquires the time synchronization using the preamble received from the transmitter, and the estimates the frequency offset based on the acquired time synchronization.

Technical Solution

In accordance with an aspect of the present invention, there is provided a time synchronization method using a preamble transmitted from a transmitter to a receiver in an OFDM communication network, including the steps of: a) calculating a moving sum of a first sequence previously stored in the receiver and a second sequence obtained by a product of neighboring elements in a received signal when the received signal containing a preamble is received from the transmitter; b) estimating a location of the received signal corresponding to the moving sum having a maximum value; and c) acquiring a time synchronization with respect to the received signal, based on the estimated location, wherein the first sequence is obtained from a product of neighboring elements in the preamble and a correlation value obtained by correlating another sequence with the first sequence is smaller than a predetermined value.

In accordance with another aspect of the present invention, there is provided a time synchronization method using a preamble transmitted from a transmitter to a receiver in OFDM communication network, including the steps of: a) calculating a moving sum of a first sequence previously stored in the receiver and a second sequence obtained by a product of neighboring elements in a received signal while increasing a location of the received signal from zero by "1", the received signal containing a preamble; b) stopping calculating the moving sum when the moving sum is greater than a preset threshold value; c) estimating a location of the received signal when the calculation of the moving sum is stopped; and d) acquiring a time synchronization with respect to the received signal, based on the estimated location, wherein the first sequence is obtained from a product of neighboring elements in the preamble and a correlation value obtained by correlating another sequence with the first sequence is smaller than a predetermined value.

In accordance with a further aspect of the present invention, there is provided a frequency offset estimation method for estimating a frequency offset when a time synchronization is acquired using a preamble transmitted from a transmitter to a receiver in an OFDM communication network, including the steps of: a) acquiring a time synchronization for a received signal, based on a moving sum of a first sequence previously stored in the receiver and a second sequence obtained by a product of neighboring elements in a received signal when the received signal containing a preamble is received from the transmitter; and b) estimating a corresponding frequency offset using a phase of the calculated moving sum corresponding to an acquired time synchronization state as a parameter, wherein the first sequence is obtained from a product of neighboring elements in the preamble and a correlation value obtained by correlating another sequence with the first sequence is smaller than a predetermined value.

In accordance with a further aspect of the present invention, there is provided a frequency offset estimation method for estimating a frequency offset when a time synchronization is acquired using a preamble transmitted from a transmitter to a receiver in an OFDM communication network, including the steps of: a) acquiring a time synchronization for a received signal, based on a moving sum of a first sequence previously stored in the receiver and a second sequence obtained by a product of neighboring elements in a received signal when the received signal containing a preamble is received from the transmitter; b) generating a similar moving sum, which is similar to an acquired time synchronization state, by correlating a third sequence obtained from a first product of elements spaced apart by a predetermined distance in the preamble and a fourth sequence obtained from a second product of elements spaced apart by the predetermined distance in the received signal corresponding to the first product; c) approximating the similar moving sum, based on a location of the time-synchronized received signal; d) selecting a parameter corresponding to a frequency offset having a predetermined magnitude when a phase of the approximated similar moving sum is calculated, and recalculating another similar moving sum using the selected parameter; and e) estimating a corresponding frequency offset using the moving sum corresponding to the acquired time synchronization state and the recalculated similar moving sum, wherein the first sequence is obtained from a product of neighboring elements in the preamble and a correlation value obtained by correlating another sequence with the first sequence is smaller than a predetermined value.

In accordance with a further aspect of the present invention, there is provided a preamble contained in transmitted signal, and used for acquiring a time synchronization or estimating a frequency offset in an OFDM communication network, the preamble including a plurality of elements, wherein the elements of the preamble are configured to produce a first sequence when multiplied with neighboring elements in the preamble, and the value resulted from correlating the first sequence with the sequence other than itself is smaller than a predetermined value.

Advantageous Effects

In accordance with the present invention, an OFDM system can acquire accurately time synchronization and estimate a wide range of frequency offset based on the acquired time synchronization in time domain.

In addition, the preamble is designed with constant envelop in time domain such that a correlation value obtained by correlating another sequence with a fourth sequence obtained from a product of neighboring elements in the preamble is smaller than a predetermined value. Therefore, a PAPR problem can be solved and a margin in a transmission power limitation can be obtained.

In the case of a terminal with a low-performance amplifier, it is possible to prevent the performance degradation due to the transmission of a preamble required to transmit data to a base station through an uplink.

Further, the receiver need not process a received preamble through an FFT in a frequency domain. Therefore, a signal processing delay time can be remarkably reduced.

Furthermore, the receiver can acquire the time synchronization only using the preamble received from the transmitter and the correlation between the sequence previously stored in a memory.

When a plurality of terminals try to access a single base station at the same time, the interference caused by the signal transmission between the terminals can be eliminated.

Moreover, both the integer part and the decimal part of the frequency offset in an entire range can be estimated in time domain without FFT and frequency-domain signal processing.

BRIEF DESCRIPTION OF THE DRAWINGS

The above and other objects and features of the present invention will become apparent from the following description of the preferred embodiments given in conjunction with the accompanying drawings, in which:

FIG. 1 illustrates a preamble structure in accordance with an embodiment of the present invention;

FIG. 2 is a flowchart illustrating a time synchronization method using a preamble in accordance with an embodiment of the present invention; and FIG. 3 is a flowchart illustrating a frequency offset estimation method when a time synchronization is achieved.

BEST MODE FOR THE INVENTION

Preferred embodiments of the present invention will be described herein below with reference to the accompanying drawings. In the following description, well-known functions or constructions are not described in detail since they would obscure the invention in unnecessary detail.

The present invention provides a design of a preamble structure used for a time synchronization and a frequency offset estimation in an OFDM system, a time synchronization method, and a frequency offset estimation method based on the acquired time synchronization. In addition, the present invention provides a time/frequency synchronization method adapted for an OFDM-based satellite communication system.

The preamble is designed such that a correlation value obtained by correlating another sequence with a sequence obtained from a product of neighboring elements in the preamble is smaller than a predetermined value. The preamble structure in accordance with the present invention will be described with reference to FIG. 1, the time synchronization method using the preamble will be described with reference to FIG. 2, and the frequency offset estimation method based on the acquired time synchronization will be described with reference to FIG. 3.

FIG. 1 illustrates a preamble structure in accordance with an embodiment of the present invention.

In FIG. 1, an upper side shows a time-domain preamble sequence, and a lower side shows a constant amplitude and zero autocorrelation (CAZAC) sequence. The CAZAC sequence has a constant amplitude and excellent autocorrelation property.

Referring to FIG. 1, a created sequence obtained by a product of neighboring elements in the preamble is a CAZAC sequence with a fine autocorrelation, i.e., $p_0 \times p_1, p_1 \times p_2, \ldots, p_{N-3} \times p_{N-2}$, and $p_{N-2} \times p_{N-1}$. Although the CAZAC will be taken as an example of the sequence with the fine autocorrelation, PN sequences such as a gold sequence and an M-sequence can also be used as a preamble design model.

That is, before a transmitter transmits an OFDM symbol, it transmits the preamble to a beginning of the OFDM symbol such that a receiver can perform a time synchronization and estimate a frequency offset. When the preamble is generated in a time domain, the product of the neighboring elements in the preamble is made to be a CAZAC sequence, that is, $p_0 \times p_1 = s_0, p_1 \times p_2 = s_1, \ldots, p_{N-3} \times p_{N-2} = s_{N-3}, p_{N-2} \times p_{N-1} = s_{N-2}$.

When the preamble is designed in this way, because an envelop of the CAZAC sequence is always constant, it is possible to solve a peak-to-average-power-ratio (PAPR) problem that is one of the most important problems in the OFDM. Therefore, it is possible to obtain a margin in the transmission power limitation required when the transmitter transmits the preamble or pilot symbol.

Specifically, when a terminal performs a transmitter function in an OFDM system, for example, when the terminal transmits data to a base station through an uplink, the preamble transmission is much sensitive to the PAPR because an amplifier of the terminal has a lower performance than that of the base station. However, when the terminal transmits the preamble of the present invention to the base station, the performance degradation can be prevented.

The procedures of designing the above-described preamble will be described below in detail.

When the preamble sequence having N elements in a time domain is defined as P, the preamble sequence P can be expressed as Eq. 1.

$$P=[p_0, p_1, \ldots, p_{N-1}] \qquad \text{Eq. 1}$$

When the CAZAC sequence is defined as S, the CAZAC sequence S can be expressed as Eq. 2.

$$S=[s_0, s_1, \ldots, s_{N-1}] \qquad \text{Eq. 2}$$

The preamble sequence is designed to satisfy Eq. 3 in order to make the preamble sequence P of Eq. 1 be the CAZAC sequence S.

$$p_{i+1}=p_i s^*_i, \text{ for } i=1, \ldots N-2 \qquad \text{Eq. 3}$$

An initial value $p_0$ can be set to any complex number making the envelop be "1". In this embodiment, the initial value $p_0$ is set as Eq. 4.

$$p_0=(1+j)/\sqrt{2} \qquad \text{Eq. 4}$$

The application of the designed preamble to the signal transmission process will be described below.

The time-domain preamble generated in the above-described design is stored in a memory of the transmitter, and the stored preamble is transmitted to the receiver over a carrier before a real signal is transmitted as a time-domain signal through an inverse fast Fourier transform (IFFT).

In another transmission method, the time-domain preamble is converted into a frequency-domain signal through an FFT and is stored in a memory. Then, the stored preamble is processed together with the real signal and is added to a beginning of the real signal and is transmitted to the receiver.

Meanwhile, when the preamble is designed in the above-described way, the receiver can perform the time synchronization and the frequency offset estimation in the time domain. This method can remarkably reduce the signal processing delay time, compared with the conventional method in which the preamble is processed through the FFT in the frequency domain.

In addition, by making the product of the neighboring elements in the preamble sequence be the CAZAC sequence, the receiver can acquire the time synchronization only using the correlation of a sequence obtained by the product of the neighboring elements of the received signal and the previously known CAZAC sequence. Especially, due to the CAZAC sequence property, the correlation value is the maximum when the received signal accurately coincides with the previously known signal, and it is zero when the received signal does not accurately coincide with the previously known signal. Therefore, the time synchronization can be acquired more accurately.

Furthermore, in the case of an uplink, that is, when the a plurality of terminals try to access a signal base station at the same time during an initial synchronization process, TX signals of other terminals affects a TX signal of a terminal trying to acquire the time synchronization, thus degrading the synchronization performance. In accordance with the present invention, however, interference between the terminals can be cancelled by allocating different preamble sequences, e.g., PN sequences, to the terminals.

A time synchronization method using the preamble of FIG. 1 in accordance with an embodiment of the present invention will be described below with reference to FIG. 2.

FIG. 2 is a flowchart illustrating a time synchronization method using the preamble of FIG. 1 in accordance with an embodiment of the present invention. The time synchronization method can be implemented in a first embodiment and a second embodiment. FIG. 2 illustrates the time synchronization method in accordance with the second embodiment of the present invention. The time synchronization method in accordance with the first embodiment of the present invention will be first described without reference to FIG. 2.

In the OFDM system, when the receiver receives a signal from the transmitter, it begins a time synchronization process for finding a location of the preamble in the time domain.

Prior to a real signal transmission, it is preferable that the product of the neighboring elements in the preamble sequence between the transmitter and the receiver is designed or generated as the CAZAC sequence in the time domain and it is known that the signal is transmitted.

The receiver performs a moving sum of the previously stored CAZAC sequence and a sequence obtained from a product of neighboring elements in the received signal and performs the time synchronization at a location where the moving sum becomes maximum.

For example, when a k-th received signal sample in the time domain is defined as $r_k$, an RX signal vector $r_\theta$ where a start point of the moving sum is θ can be expressed as Eq. 5 because the OFDM symbol is comprised of N sample values.

$$r_\theta = [r_\theta r_{\theta+1} \ldots r_{\theta+N-2} r_{\theta-N-1}]^T \qquad \text{Eq. 5}$$

A vector $v_\theta$ comprised of the product of the neighbor elements of the RX signal vector of Eq. 5 can be expressed as Eq. 6.

$$v_\theta = [v_\theta v_{\theta+1} 0 v_{\theta+N-3} v_{\theta+N-2}] = [r_{\theta+1} r^*_\theta r_{\theta+2} r^*_{\theta+1} \\ 0 r_{\theta+N-2} r^*_{\theta+N-3} r_{\theta+N-1} r^*_{\theta+N-2}] \qquad \text{Eq. 6}$$

A moving sum X(θ) of the preamble $v_\theta$ of Eq. 6 and the CAZAC sequence can be expressed as Eq. 7.

$$X(\theta) = s^T v_\theta \qquad \text{Eq. 7}$$

A location θ where the moving sum X(θ) of Eq. 7 becomes maximum is found and the time synchronization of TX/RX signals is performed based on the location θ.

Meanwhile, the time synchronization process in accordance with the second embodiment of the present invention is illustrated in FIG. 2.

As described above, the time synchronization method in accordance with the first embodiment of the present invention can easily acquire the time synchronization by finding maximum value of the moving sum X(θ). However, in the case of a low-performance terminal, a load is increased due to the moving sum process and it takes much time to find the location θ.

Hereinafter, the time synchronization method in accordance with the second embodiment of the present invention will be described.

Referring to FIG. 2, in step S200, the receiver receives a preamble from the transmitter. In steps S201 to S205, while θ increases from zero by "1", the moving sum X(θ) is calculated using the equations of the time synchronization processes in accordance with the first embodiment of the present invention. Specifically, when the moving sum X(θ) is greater than a preset threshold value $TH_\theta$ the moving sum process is stopped and the corresponding location θ is estimated as a parameter $\hat{\theta}$.

The time synchronization is acquired based on the estimated location $\hat{\theta}$.

The effects of the time synchronization methods in accordance with the first and second embodiments of the present invention are as follows.

Considering the fact that the TX/RX channels in the satellite communication network experience the rician fading having a line of sight (LoS) component, the time synchronization methods of the present invention can be efficiently applied to the satellite communication network because there is no interference caused by multipath.

In the related art, when the iterative preamble structure is used, the time synchronization ambiguity occurs as much as the CP duration. In order to solve the time synchronization ambiguity, the phase information must be compensated using the pilot symbol, resulting in overhead.

On the contrary, because the present invention uses the CAZAC sequence with the fine autocorrelation, the time synchronization can be accurately acquired. In addition, the phase compensation in frequency domain can not be required. Therefore, the signal processing time in the receiver can be reduced.

Although the influence of the multipath interference is reduced using the CAZAC sequence without using the channel information on the multipath environment, the performance degradation must be considered when the present invention is applied to the terrestrial mobile communication network environment having the Rayleigh fading channel.

FIG. 3 is a flowchart illustrating a frequency offset estimation method when the time synchronization is acquired in accordance with an embodiment of the present invention.

The frequency offset is estimated in the time domain using the signal vector $v_\theta$ comprised of the product of the neighboring elements in the preamble used to acquire the time synchronization.

The frequency offset estimation method can be implemented in a third embodiment and a fourth embodiment. FIG. 3 illustrates the frequency offset estimation method in accordance with the third embodiment of the present invention. The frequency offset estimation method in accordance with the third embodiment of the present invention will be first described without reference to FIG. 3.

In the time synchronization methods in accordance with the first and second embodiments of the present invention, X(θ) when the time synchronization is acquired can be expressed as Eq. 8.

$$X(\theta) \approx \sum_{k=0}^{N-2} |h_k|^2 |p_k|^2 |s_k|^2 e^{j2\pi\varepsilon/N} \qquad \text{Eq. 8}$$

where $h_k$ represents a channel influence during an index k time, ε represents a frequency offset, $p_k$ represents a k-th value of a preamble sequence P, and $s_k$ represents a k-th value of a CAZAC sequence S.

Considering the fact that $h_k$ of Eq. 8 has a similar value according to time in the satellite communication network, $h_{k+1} h^*_k$ can be expressed as $|h_k|^2$. Therefore, the phase of X(θ) when the time synchronization is acquired is influenced only by the frequency offset. Thus, the frequency offset can be estimated as given by Eq. 9.

$$\hat{\varepsilon} = (N/2\pi)\text{angle}(X(\theta)) \qquad \text{Eq. 9}$$

where N represents the number of preamble elements.

The frequency offset estimation method in accordance with the third embodiment of the present invention has the following effects.

In the related art, only the decimal part of the frequency offset in the time domain can be estimated, and the received signal must be converted into the frequency-domain signal through the FFT and then signal-processed in order to estimate the integer part of the frequency offset.

On the contrary, as can be seen from Eq. 9, the frequency offset estimation method in accordance with the third embodiment of the present invention can estimate both the decimal part and the integer part of the frequency offset in a range of $-N/2 < \varepsilon < N/2$.

The performance of the frequency offset estimation method in accordance with the third embodiment of the present invention may be slightly degraded due to the estimation theory that the estimation error increases when the estimation range is widened. The frequency offset estimation method that can solve the problem in accordance with the fourth embodiment of the present invention will be described in detail with reference to FIG. 3.

Referring to FIG. 3, in step S301, X'(θ) is made which is similar to X(θ) used for the time synchronization in the time synchronization methods in accordance with the first and second embodiments of the present invention. X'(θ) expressed as Eq. 10 is obtained by correlating a first sequence obtained from a first product of elements spaced apart by "m" in the preamble and a second sequence obtained from a second product of elements spaced apart by "m" in the received signal corresponding to the first product.

$$X'(\theta_m) = \sum_{k=0}^{N-m-1} (r_{k+\theta+m} r^*_{k+\theta}) p_k p^*_{k+m} \qquad \text{Eq. 10}$$

In step S302, X'(θ) of Eq. 10 is approximated as Eq. 11 at the location where the time synchronization is acquired like in Eq. 6.

$$X'(\theta_m) \approx \sum_{k=0}^{N-m-1} |h_k|^2 |p_k|^2 |p_{k+m}|^2 e^{j2\pi\varepsilon m/N} \qquad \text{Eq. 11}$$

In step S303, the phase is calculated using Eq. 12 in order to estimate the frequency offset from the approximated X'(θ).

$$\phi_m = \text{angle}(X'(\theta_m)) \qquad \text{Eq. 12}$$

After calculating the phase, M having an appropriate frequency offset (ε) is selected. a total (M-1) number of X'(θ) corresponding to m=1 up to M-1 are calculated under condition that the selected M is less than N/(2M).

In step S305, after calculating X'(θ), the frequency offset ($\hat{\varepsilon}$) expressed as Eq. 13 is estimated using X(θ) obtained in the time synchronization method and X'(θ).

$$\hat{\varepsilon} = \frac{N}{2\pi}\left(w(0)\phi_1 + \sum_{m=1}^{X-1} w(m)\frac{\hat{\phi}_{M-m+1}}{M-m+1}\right) \qquad \text{Eq. 13}$$

where w(m) represents a weighting factor between X(θ) and X'(θ).

In Eq. 13, X is a system parameter that can have a value ranging from "2" up to "M". It is preferable that X should be appropriately selected considering the complexity and performance of the frequency offset estimation method.

For example, if X of Eq. 13 increases, the performance of the frequency offset estimation is excellent. However, the complexity of the frequency offset estimation may increase. Therefore, in order to minimize a mean square estimation error of the frequency offset, the weighting factor w(m) is selected like Eq. 14.

$$w(p) = \begin{cases} \dfrac{12(N-1)}{(X-1)[12(N-M-1)(M+1)^2 + X\{6(M+1)(3M-2N+3) + 2(N-3M-3)(2X-1)\}] + 12(N-1)}, & \text{for } p-0 \\[2ex] \dfrac{12(N-M-p-1)(N-p+1)^2}{(X-1)[12(N-M-1)(M+1)^2 + X\{6(M+1)(3M-2N+3) + 2(N-3M-3)(2X-1)\}] - 12(N-1)} & \text{for } 1 D p D X - 1 \end{cases} \qquad \text{Eq. 14}$$

The frequency offset estimation method in accordance with the fourth embodiment of the present invention has the following effects.

Although the frequency offset estimation method in accordance with the third embodiment of the present invention has the frequency offset range of −N/2<ε<N/2, the frequency offset estimation method in accordance with the fourth embodiment of the present invention has the maximum range that ε can have. Therefore, all ranges of the frequency offset can be estimated.

In addition, when the value of X is appropriately considering the tradeoff of the increase of the calculation by minimizing the mean square estimation error, the performance is increasingly excellent as the value of X increases.

Although the satellite communication network has been described, it is apparent to those skilled in the art that the present invention can also be applied to any signal transmission/reception networks based on the OFDM.

The methods in accordance with the embodiments of the present invention can be realized as programs and stored in a computer-readable recording medium that can execute the programs. Examples of the computer-readable recording medium include CD-ROM, RAM, ROM, floppy disks, hard disks, magneto-optical disks and the like.

The present application contains subject matter related to Korean patent application No. 2006-0091984, filed with the Korean Intellectual Property Office on Sep. 21, 2006, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A time synchronization method using a preamble transmitted from a transmitter to a receiver in an Orthogonal Frequency Division Multiplexing (OFDM) communication network, comprising the steps of:
   a) calculating a moving sum of a first sequence previously stored in the receiver and a second sequence obtained by a product of neighboring elements in a received signal when the received signal containing a preamble is received from the transmitter;
   b) estimating a location of the received signal corresponding to the moving sum having a maximum value; and
   c) acquiring a time synchronization with respect to the received signal, based on the estimated location,
   wherein the first sequence is obtained from a product of neighboring elements in the preamble and a correlation value obtained by correlating another sequence with the first sequence is smaller than a predetermined value.

2. The time synchronization method as recited in claim 1, wherein the first sequence is a pseudo noise (PN) sequence.

3. The time synchronization method as recited in claim 2, wherein the first sequence includes a constant amplitude and zero autocorrelation (CAZAC) sequence, a gold sequence and an M-sequence.

\* \* \* \* \*